Nov. 24, 1931.   J. E. PORTER   1,832,878
SAW GUMMER
Filed March 18, 1929   5 Sheets-Sheet 1

Inventor
Jay E. Porter
By Liverance and
Van Antwerp
Attorneys

Nov. 24, 1931. J. E. PORTER 1,832,878
SAW GUMMER
Filed March 18, 1929 5 Sheets-Sheet 2

Fig. 2.

Inventor
Jay E. Porter
By Liverance and
Van Antwerp
Attorneys

Nov. 24, 1931.    J. E. PORTER    1,832,878
SAW GUMMER
Filed March 18, 1929    5 Sheets-Sheet 5

Inventor
Jay E. Porter
By Livranes &
Van Antwerp
Attorneys

Patented Nov. 24, 1931

1,832,878

UNITED STATES PATENT OFFICE

JAY E. PORTER, OF MUSKEGON, MICHIGAN

SAW GUMMER

Application filed March 18, 1929. Serial No. 347,883.

This invention relates to a saw gumming or grinding machine used to grind the teeth of circular saws or cutters which may be used in sawing or cutting wood or metal. The present invention is directed to many novel improvements in a machine of this character whereby a circular saw or cutter having a large number of teeth around it may be secured in the machine and the teeth automatically ground one at a time, the saw being moved to the extent of one tooth between each grinding operation so that the teeth are successively presented to the grinding wheel and ground thereby.

In order to effectively perform the grinding operation it is necessary to equip the machine with various means of adjustment and arrangements for automatically operating the parts thereof so as to lift the grinding wheel between successive movements of the saw and, after an operation on all of the teeth has been performed entirely around the saw, should it be desired to still further grind all the teeth, a mechanism is used for automatically changing the relative position of the saw teeth and the grinding wheel so that the grinding wheel will operate farther into the saw disk between the teeth on a succeeding cycle of grinding operations on the teeth of the saw.

A very necessary and essential feature of the present invention for machines of this character is concerned with the mounting of the shaft on which the saw or cutter is affixed to completely eliminate and obviate any endwise play of the shaft or any lost motion which would be very detrimental to the treatment of the saw should it occur. Likewise the shaft carrying the grinding wheel must be similarly insured against lengthwise movement or lost motion of any kind and my invention includes novel and very practical yet simple means of effectively attaining these ends.

Many other objects and purposes together with novel constructions for attaining the same, may be understood from the following description taken in connection with the accompanying drawings, in which, Fig. 1 is a front elevation of the machine of my invention, parts of the mechanism at the upper front portion of the machine being shown in longitudinal section.

Like reference characters refer to like parts in the different figures of the drawings.

In the construction of the machine, a supporting housing is provided having a base 1, from which a front vertical wall 2 extends upwardly spaced from a vertical back 3, there being vertical sides 4 and 5 spaced apart and the upper ends of said sides, front and back, being connected by a top 6. This forms a hollow supporting housing in which a portion of the mechanism is enclosed.

The arms 7 extend upwardly and to the rear at opposite sides of the top 6 of the housing described and have bearings 8 at their upper ends for rotatably mounting a horizontal shaft 9 which extends between and through the bearings and is equipped with a pulley 10 at one end around which a belt from any suitable motor may be passed to drive the machine, the shaft 9 being the main driving shaft of the machine. The shaft 9 at its opposite end is equipped with a relatively small pulley 11 and between its ends with a large pulley 12.

A relatively large bar or beam 13 of metal is provided with rearwardly extending spaced apart arms 14 at its inner end through which the shaft 9 passes and about which the bar 13 may have a limited pivotal movement. The bar 13 extends over the top 6 and to the front of the machine and is divided at its front end, forming two outwardly extending bearing housings 15, within which suitable bearings are placed for rotatably mounting the shaft 16. The manner in which the shaft 16 is maintained against longitudinal or other undesired movement will be later described.

Figure 2:
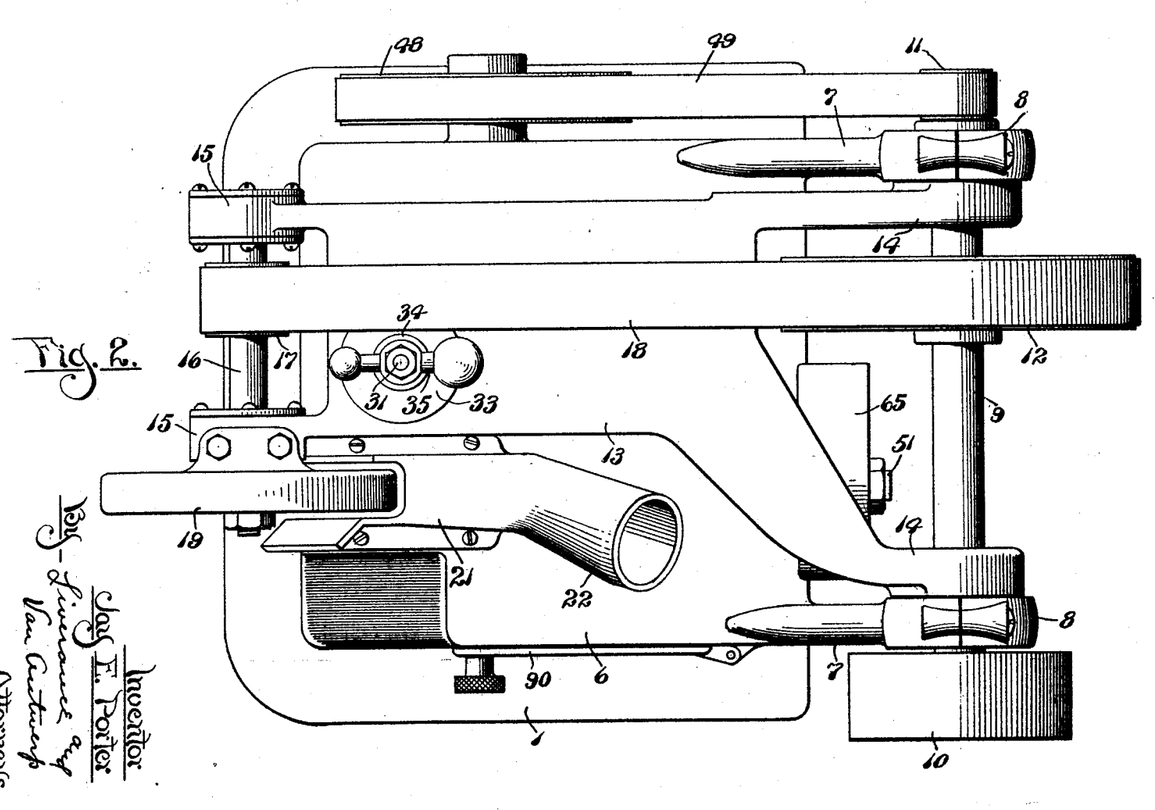
Fig. 2 is a plan view of the machine.

The shaft 16 has a pulley 17 thereon in alinement with the large pulley 12 described and an endless belt 18 passes around the two pulleys so that the shaft 16 is driven at very high speed from the shaft 9, as is evident. A guard housing 19 is secured to the arm 15 at one side (see Fig. 2) to house a grinding wheel 20 detachably secured at one end of the shaft 16. The housing 19 is at the front end of a chute 21 which has an outlet 22 extending to the rear thru which the dust and grindings coming from the contact of the grinding wheel with a saw are carried and it is, of course, to be understood that any suitable dust collecting conduit may be attached to the end of the outlet 22.

Figure 4:
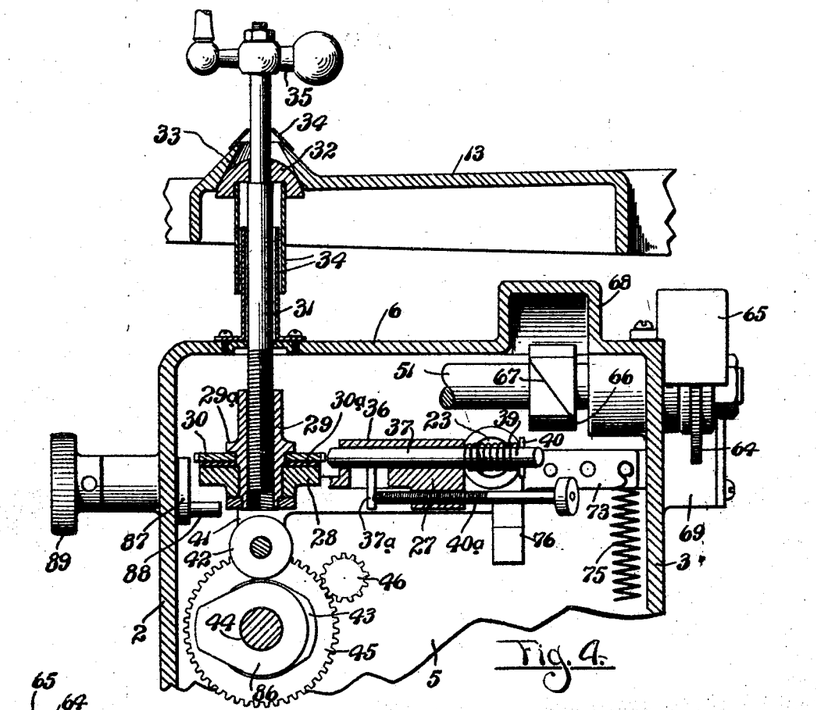
Fig. 4 is a fragmentary vertical section from front to rear, taken substantially on the plane of line 4—4 of Fig. 1.
Figure 5:
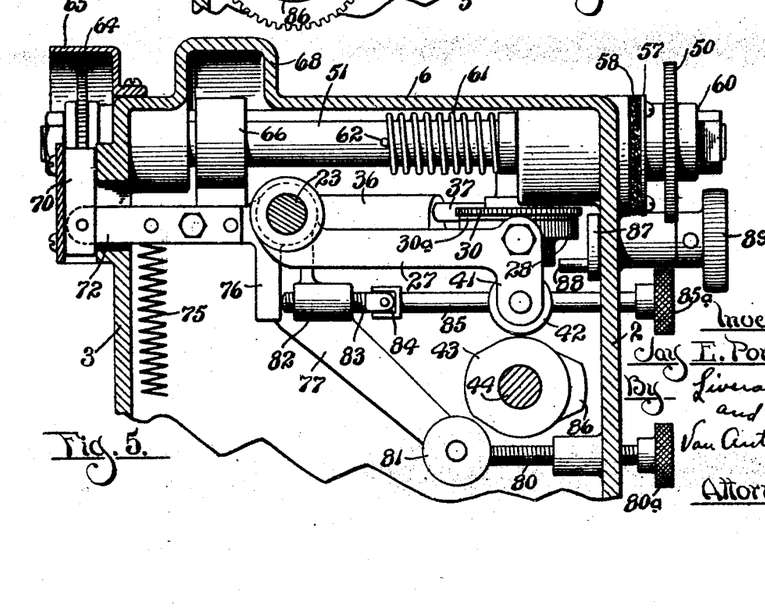
Fig. 5 is a vertical section from the front to the rear of the machine, substantially on the plane of line 5—5 of Fig. 6, looking in the direction indicated by the arrows.
Figure 6:
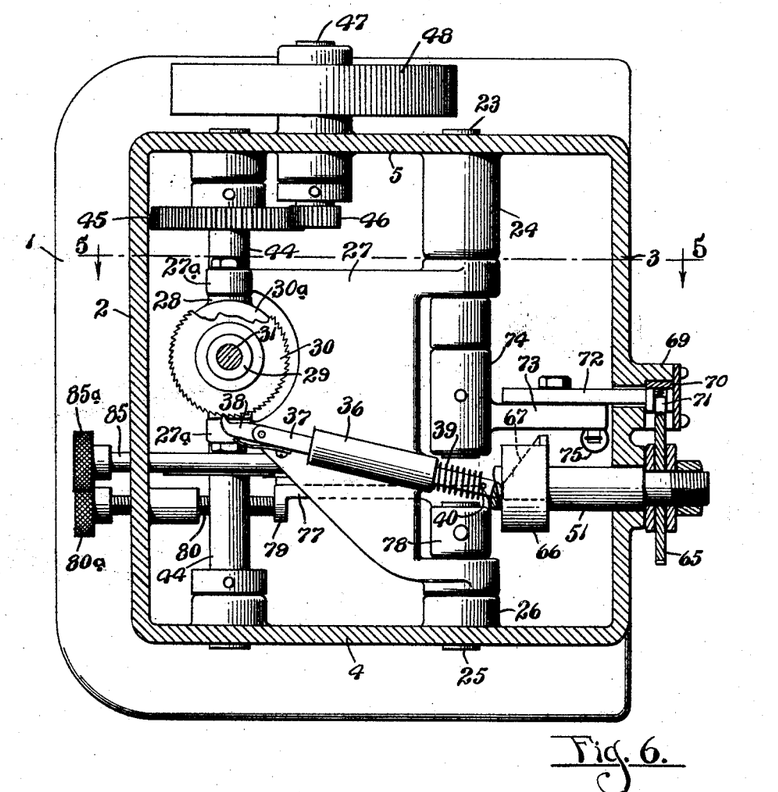
Fig. 6 is a horizontal section through the upper part of the machine, the plane of the section being approximately immediately below the saw or cutter carrying shaft.
Figure 7:
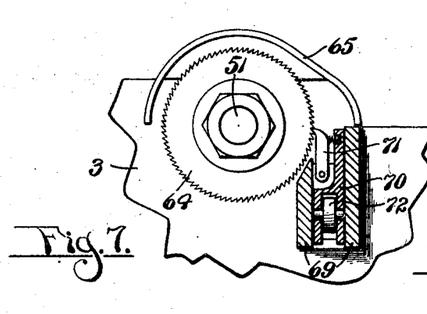
Fig. 7 is a fragmentary detail in rear elevation and partly in vertical section, illustrative of the mechanism for periodically turning the saw or cutter carrying shaft, and, Fig. 8 is a fragmentary enlarged vertical section through the mounting for one end of the grinding wheel shaft and illustrating the means used to hold said shaft against endwise movement.

A shaft 23 is mounted within the housing and supported in an elongated boss 24 extending inwardly from the inner side of the side 5 (Fig. 6) while at the opposite side of the supporting housing a second shaft 25 extends inwardly and is supported by a boss 26 extending inwardly from the opposite side 4. A horizontal plate 27 is formed with two spaced apart bearings at its rear end through which the two shafts 23 and 25 pass. Said plate extends forwardly toward the front side 2, is divided at its front to provide two spaced apart bearings 27a between which a disk-like member 28 is mounted for limited rocking movement, having oppositely disposed trunnions extending through the bearings 27a. A vertical interiorly threaded sleeve 29 is permanently secured on and extends through the member 28 a distance above the same and is provided with an outwardly extending collar 29a (Fig. 4), between which and the upper side of the member 28 a ratchet wheel 30 and a circular friction disk 30a are positioned and clamped in place, the friction disk being located underneath the ratchet wheel, as shown.

A vertical shaft 31 is threaded at its lower end to enter the interiorly threaded sleeve 29. The shaft 31 extends upwardly through the top 6 and is provided a distance below its lower end with a semi-spherical friction member 32 which bears against the tapered seat 33 formed at the upper side of the beam 13, the shaft 31 extending above said beam. Various guard sleeves and the like, indicated at 34, are provided to partly enclose the shaft and cover the openings so as to prevent entrance of dirt and dust to the mechanism within the supporting housing. A crank 35 is permanently secured to the upper end of the shaft 31, it being evident that by turning the crank the relative position of the plate 27 to the beam 13 may be changed.

On the upper side of the plate 27 an elongated guide sleeve 36 is provided, through which a rod 37 passes and which at its forward end carries a pivotally mounted spring actuated dog 38 to engage with the teeth of the ratchet disk 30. A coiled spring 39 is located around the rod 37 back of the sleeve 36, bearing at one end against the rear end of said sleeve and at the other end against a bar 40 which extends through the rod. The spring 39 has a tendency to move the rod 37 to the rear and carry the dog back over the teeth of the disk 30. A pin 37a (Fig. 4) extends downwardly from the rod 37 and is adapted to come against the front end of an adjustable stop screw 40a, which is threaded through a downwardly projecting lug on the plate 27, thereby limiting the extent of the rearward movement of the rod 37 which extent of movement may be changed by adjusting the screw 40a to different positions.

Figures 1, 8:
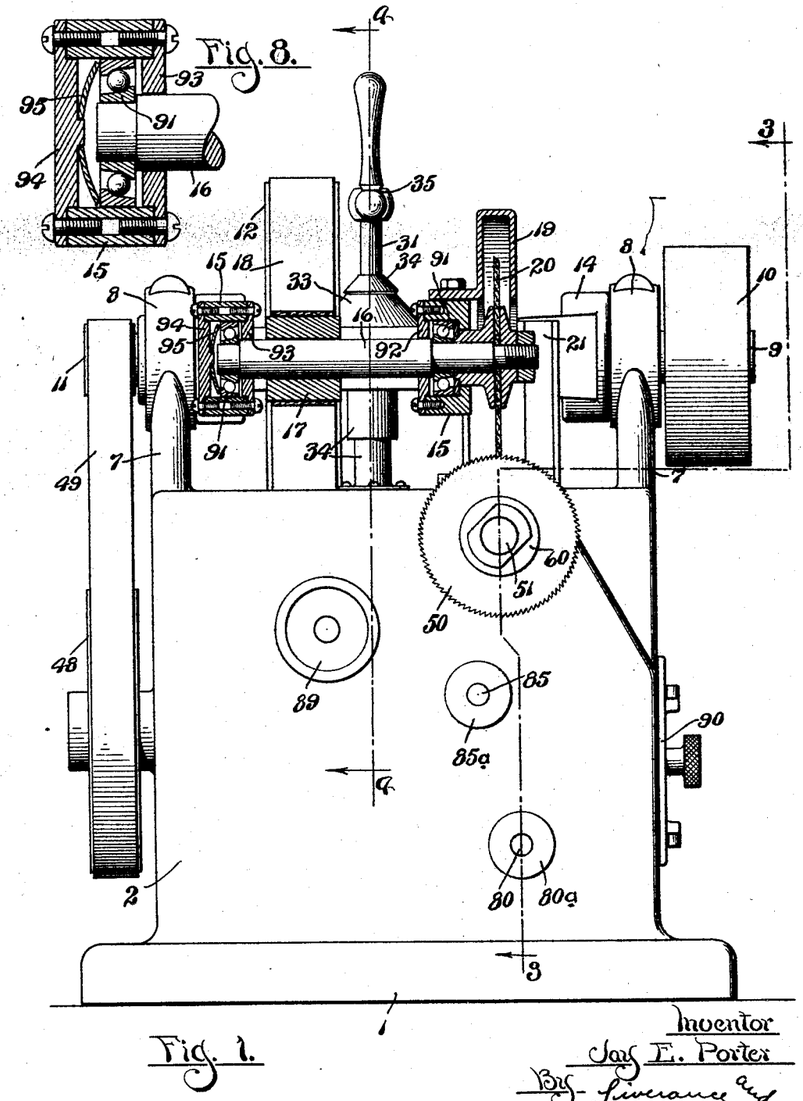

The plate 27 at its front end and at its underside is equipped with downwardly extending arms 41 which carry collars 42 adapted to bear on cams 43 mounted on a horizontal shaft 44 which extends between the sides 4 and 5 of the supporting housing. The shaft 44 is provided with a gear 45 meshing with a pinion 46 secured to the inner end of a short shaft 47 which extends through the side 5 and is mounted in suitable bosses therein to which a pulley 48 is secured in alinement with the pulley 11 on the drive shaft 9, previously described, whereby an endless belt 49 (Fig. 1) is passed around the two pulleys 11 and 48 to drive the shaft 44 from the drive shaft at a relatively slow speed compared to the speed of rotation of the grinding wheel shaft 16.

Figure 3:
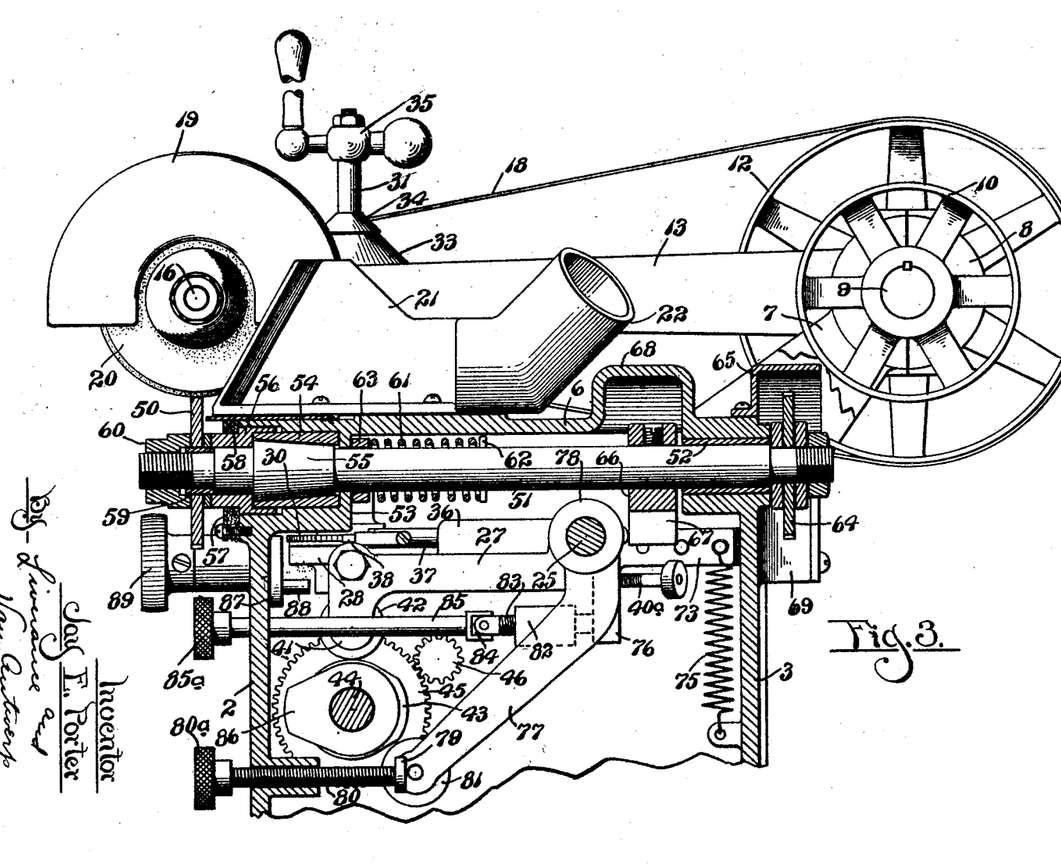
Fig. 3 is a vertical section from front to rear through the upper portion of the machine, substantially on the plane of line 3—3 of Fig. 1.

A saw or cutter to be ground, indicated at 50, is attached to the front end of the horizontal shaft 51 which is mounted immediately below the top 6 of the supporting housing and between the front and rear sides thereof so that the saw is brought immediately below the grinding wheel 20. Adjacent the rear end of shaft 51 it is mounted in any suitable bearing sleeve 52. At the front end the supporting housing is formed with a bearing housing 53, through which the shaft extends and in which a tapered bearing sleeve 54 is located, the shaft being provided with an enlargement 55 correspondingly tapered to fit the bearing 54. A second bearing sleeve 56 is provided to fit over the shaft at the front of the tapered enlargement 55 and is further provided with an annular flange to extend around the front end portion of the bearing sleeve 54 and is held in place by a plate 57 attached by screws to the outer side of the bearing housing 53 with suitable packing 58 between, as best shown in Fig. 3.

The saw is located around the projecting front end of the shaft 51 over a suitable sleeve 59 and is clamped in place by a clamping nut 60 threaded onto the end of the shaft, it being apparent that a saw may be thus detachably secured to the shaft and after it has been properly ground may be removed therefrom.

A coiled spring 61, under compression, is located around the shaft 51, one end thereof bearing against a pin 62 which extends through the shaft and the other against a ring or collar 63 which in turn is placed against the inner end of the bearing housing 53. The tendency of the spring 61 is to move the shaft to the rear and thus insure a snug engagement of the tapered enlargement 55 of the shaft with its surrounding tapered sleeve 54 and eliminate any possibility of lost motion or endwise play of the shaft or any chattering or other undesired action of the saw with respect to the grinding wheel acting thereupon.

At the rear end of the shaft 51 and outside of the housing support a ratchet disk 64 is secured, said disk having the same number of teeth as there are on the saw 51 which is to be ground. The disk is located underneath a covering shell 65, as shown. Immediately in front of the bearing sleeve 52 a cam member 66, having an inclined cam surface 67 (Fig. 6) is secured to the shaft and turns therewith, the rear end of the rod 37 bearing against the cam member so that during a part of the rotation of shaft 51 the rod 37 is moved in a forward direction by reason of its engagement with the cam, thereby turning the ratchet disk 40 and returns to its rear position under the influence of the spring 39 when the cam permits such movement. The upper side 6 of the housing is provided with a raised portion 68 underneath which the cam member turns.

At one side of the rear end of shaft 51, vertical guides 69 are provided and extend to the rear from the back 3, between which a vertical slide 70 is mounted for movement. It carries a spring actuated dog 71, pivotally mounted at the upper part of the slide and which engages with the teeth of the ratchet wheel 64. The slide 70 is carried at the outer rear end of the arm 72 which extends through a slot in the back 3 and is permanently secured to an arm 73 integral with and extending rearwardly from a sleeve 74 mounted on the shaft 23. A coiled tension spring 75 is connected at its upper end to the arm 73 and at its lower end to the back 3, the action of which is to draw the arm 73 in a downward direction. A downwardly extending arm 76 is formed integral with the sleeve 74 the use of which will later appear.

A lever 77, formed at its upper end with a sleeve 78, to mount the same upon the shaft 25, extends downwardly and forwardly and at its free lower end is provided with a lateral offset ear 79, against which the rear end of an adjusting screw 80 threaded through the front side 2 of the housing support bears, the screw being equipped with a knurled operating head 80a at its front end. A roller 81 is mounted at the opposite side of the lower end of lever 77. The lever 77 is provided with an integral horizontal interiorly threaded sleeve 82 at one side which lies directly in front of the arm 76. A short rod 83 is threaded through the sleeve 82 to bear at its lower end against the front side of the arm 76. It has a universal joint connection, illustrated at 84, with the rear end of the rod 85, which extends forward and passes thru the front side 2 of the housing and is equipped with an operating head 85a at its front end.

The shaft 44 carries an additional cam 86 which, on rotation of said shaft, comes against the roller 81 at the lower end of the lever 77, thereby turning the lever about the axis of shaft 23 to oscillate the bar 72 in an upward direction causing dog 71 to turn disk 64 and move the shaft 51 one step of movement, it being evident that the parts return to their initial position under the influence of spring 75 after the cam 86 has moved away from roller 81.

A disk 87 is located in a vertical plane at the rear side of the front side 2 (Fig. 4), being mounted on a shaft which extends through said front side 2, and is equipped with a rearwardly extending pin 88 offset from the center of the disk and extending under the member 28. The front end of the shaft to which disk 87 is attached is provided with an operating head 89 for manual operation whereby by turning the head the pin 88 may be brought underneath the member 28 to lift the same and the parts attached therewith, elevating the grinding wheel 20 above the saw when it is placed on or taken off the shaft 51. It is evident that all of the manually operable devices for adjusting the parts for different conditions are accessible from outside of the machine except the screw threaded rod 40a, and an opening is made in the side 4 of the supporting housing which may be closed by a door 90 (Figs. 1 and 2), permitting access to the rod 40a for any adjustment that may be desired.

The shaft 16, at one end of which the grinding wheel 20 is secured, is provided with ball bearings 91 adjacent its ends which are housed within the bearing housings 15. The bearing housing 15 nearest to the grinding wheel 20 (Fig. 1) is open at one side to receive bearing 91, being thereafter closed by a plate 92. The bearing housing 15 at the opposite end is open at both ends, being closed by opposed plates 93 and 94 through the first of which the shaft 16 passes while the latter carries a spring disk 95 to press against the ball bearing 91 at the adjacent end of the shaft and tend to move the shaft to the right (Fig. 1) holding the shaft against any longitudinal movement which might develop chattering and affect the proper rotative movement of the grinding wheel 20.

It is evident with this construction that the shaft 16, driven at high speed, carries the grinding wheel 20 to act upon a saw 50 below it. The rotation of the shaft 44 causes a periodical raising and lowering of the plate 27 and, therefore, lifts the beam 13 and lowers it so as to raise and lower the grinding wheel 20. The rotation of the shaft 44 also brings the cam 86 periodically against the roller 81 to rock lever 77 and, thru the threaded rod 83 mounted thereon, engage against the arm 76 to oscillate the arm 72 and causes a periodical step by step rotation of the shaft 51. thereby changing the position of the saw 50 with respect to the grinding wheel above it. The movement of the shaft 51 occurs at the time the beam 13 has been lifted so that the teeth of the saw 50 may be passed underneath the grinding wheel, after which, while the saw is at rest, the grinding wheel is lowered into operative engagement with the saw and grinds the same between any two successive teeth.

This process continues until all of the teeth around the saw have been ground. If there is to be a further grinding of the saw, there occurs automatically an adjustment of the grinding wheel with respect to the saw, effected by the reciprocation of the rod 37 which, acting upon the disk 30, turns the sleeve 29 and draws the rod 31 downwardly in accordance with the extent of turning, thereby moving the grinding wheel to a slightly lower position. It is evident that this movement is very useful in a machine of this character as in grinding saws in many instances, a complete grinding of the saw to serviceable condition cannot be done by turning the saw through one rotation only with the teeth successively ground during said rotation, but that it will be desirable or necessary to still further grind the teeth and to have the grinding wheel move farther inward toward the center of the saw on the second or other succeeding rotations of the saw.

The adjustment of the rods 83 and 80 are effective for controlling the extent of the arc through which the shaft 51 is turned with each reciprocation of the dog carrying slide 70. The head 89 is accessible for operation to lift and hold the grinding wheel above the saw when the saw is being placed on or taken away from the shaft 51. The crank 35 is accessible for adjusting the grinding wheel with respect to the saw and controlling the extent that the wheel will first feed into the saw. The friction disk at 30a holds the sleeve 29 against any turning movement when the rod 31 is rotated manually by turning the crank 35, while the frictional contact of the member 32 with its seat 33 holds the rod against turning when the sleeve 29 is turned by the reciprocating rod 37.

This construction of saw grinding or gumming machine has been used in practice and has proved especially satisfactory in operation. The appended claims define the invention which is to be considered comprehensive of all forms of structure coming within their scope.

I claim:

1. In a machine of the class described, a horizontal shaft, a supporting member in which the shaft is mounted including a bearing housing at one end of the shaft through which the shaft passes, said shaft having a tapered enlargement located in said housing, an interiorly tapered bearing sleeve around said enlargement, said sleeve being located in said housing and pressing at one end thereagainst, spring means mounted on the shaft and engaging against the bearing housing for drawing said tapered enlargement into snug engagement with said sleeve, a second bearing sleeve located around said shaft in front of the enlargement thereof extending into said bearing housing and partly over the front end of the first bearing sleeve, means for detachably securing a circular saw to the front end of the shaft, a bearing for the rear end portion of the shaft, and means for periodically turning said shaft with a step by step movement.

2. In a saw grinding machine, a support, a horizontal shaft mounted on the support, a tapered bearing for said shaft, spring means for engaging said shaft with its tapered bearing to prevent longitudinal and lateral play of the shaft said shaft being adapted to have a circular saw detachably connected thereto at one end, means for rotating the shaft with a step by step movement, a transverse shaft mounted above the saw, a grinding wheel on said transverse shaft to grind the teeth of the saw, bearings for the transverse shaft and spring pressure means engaging with one of said bearings to press the shaft in one direction and hold the same against longitudinal play.

3. In a machine of the class described, a supporting housing, arms extending upwardly from the rear portion of said housing, a horizontal drive shaft rotatably mounted through said arms, a beam pivotally mounted on the horizontal shaft and extending forwardly over the support, spaced apart bearing housings at the front end of the beam, bearings in said housings, a second shaft rotatably mounted in said bearings, spring means acting on the second shaft tending to move the same in one direction and hold it against longitudinal and lateral play, a grinding wheel secured to one end of the second shaft, a third shaft mounted in said housing support below said beam and having means at the end thereof below the grinding wheel for detachably securing a circular saw thereto in position to be acted upon by said grinding wheel, means for periodically rotating the third shaft with a step by step movement, means for periodically raising and lowering the beam about the axis of the driving shaft to lift the grinding wheel above the saw at the times of movement of the second shaft, and means to drive the second and third shafts from the main drive shaft.

4. In a saw grinding machine, a support, a saw carrying shaft rotatably mounted on said support, means for detachably connecting a saw to one end of the saw carrying shaft, means for periodically rotating said shaft with a step by step movement, a driving shaft mounted on and above the rear portion of said support, a beam pivotally mounted on the driving shaft extending forward over the support, a grinding wheel rotatably mounted at the front end of the beam directly over said saw, a plate pivotally mounted on the support to oscillate about a horizontal axis, means operated by said driving shaft for periodically raising and lowering the plate, and connecting means between said plate and beam for elevating the beam and lowering the same with the up and down movements of said plates whereby the grinding wheel is lifted at each time the saw carrying shaft is turned a step of its movement.

5. A construction containing the elements in combination defined in claim 4, wherein said means between the plate and beam comprises a vertical rod threaded at its lower end, a vertical sleeve carried by said plate into which the lower end of said rod is threaded, a bearing member carried by the shaft at the lower side of said beam, said beam having a seat against which the bearing member engages, and said rod extending through the beam, and a means for manually rotating the rod connected to the upper end thereof.

6. In a saw grinding machine, a support, means for mounting a saw for step by step rotative movement on said support, means for turning said saw step by step, a beam pivotally mounted at one end on the support, a grinding wheel rotatably mounted at the free end of the beam directly above said saw, means for driving the grinding wheel, means for manually adjusting said beam to different vertical positions, means for periodically elevating the free end of the beam at the times when the saw is being turned, and means for automatically lowering the beam a predetermined distance on one complete rotation of the saw.

7. In a saw grinding machine, a support, a saw carrying shaft rotatably mounted thereon having means for detachably connecting a circular saw at its front end, a beam pivotally mounted at one end on said support and extending to the front thereof, a grinding wheel rotatably mounted at the free end of the beam directly over the saw on said shaft, means for driving the grinding wheel, means for rotating said saw carrying shaft with a step by step movement, means for elevating the grinding wheel during the times of movement of said shaft, manually operable means for adjusting the grinding wheel toward or away from the saw, a cam fixed to said saw carrying shaft, and means interposed between the same and said manually operable means for automatically operating said means to lower the grinding wheel a predetermined distance with each rotation of the saw carrying shaft.

8. A saw grinding machine including a hollow housing support, a horizontal shaft rotatably mounted at the upper end of said support, means for detachably securing a circular saw to the front end of the shaft, a second shaft rotatably mounted on and extending through said support below and transversely of the saw carrying shaft, a cam on the second shaft, a lever pivotally mounted at its upper end and extending downwardly and forwardly, a roller at the lower end of the lever in the path of movement of said cam, a bell crank lever pivotally mounted to turn about the same axis as the lever, said bell crank lever including an outwardly extending horizontal arm and a downwardly extending vertical arm, a sleeve on the lever, a rod threaded through said sleeve bearing against the vertical arm of the bell crank lever, means extending through the front of said support for turning said screw threaded rod, a spring connected to the horizontal arm of the bell crank lever tending to pull said arm in a downward direction, a ratchet wheel fixed to the rear end of the saw carrying shaft, a vertical slide connected to the rear end of the horizontal arm of the bell crank lever, a spring actuated dog carried by said slide and held in engagement with the ratchet wheel, and means operable from the front of the machine for engaging against the edge of the lever arm for adjusting it to different positions.

9. In a saw grinding machine, a hollow supporting housing, a horizontal saw carrying shaft mounted at the upper portion of said housing, means for detachably securing a circular saw to the front end of the shaft, a beam pivotally mounted on and above said support, the pivot being at the rear of the support and the beam extending forward thereover, a grinding wheel rotatably mounted at the front end of the beam over the saw, a horizontal plate pivotally mounted at its rear located within said support and having a divided front end, a table pivotally mounted to turn on a horizontal axis between the divisions of the front end of said plate, a vertically threaded sleeve connected to said table and extending above the same, a rod threaded at its lower end extending through the beam and threaded into said sleeve, said beam having a tapered seat at its lower side, a semi-spherical bearing member carried on said rod bearing against said seat, means connected to the upper end of the rod for manually turning the same, and means for periodically raising said table and permitting it to lower by gravity.

10. A construction containing the elements in combination defined in claim 9, combined with means for automatically turning said sleeve in a direction to lower the beam with respect to said plate with each complete rotation of the saw carrying shaft.

11. In a machine of the class described, a saw grinding wheel, a saw carrying shaft, means for detachably fixing a saw to said shaft to rotate therewith, means for periodically moving said grinding wheel into and out of engagement with the teeth of said saw, bearings for rotatably supporting said saw carrying shaft, a tapered bearing sleeve incorporated in one of said bearings, said shaft having an enlarged portion snugly engaging said sleeve, spring means forcing the shaft longitudinally whereby said saw carrying shaft is held against longitudinal and lateral play, and means for rotating said saw carrying shaft with a step by step movement.

12. In a machine of the class described, a saw grinding wheel, a saw carrying shaft, means for detachably fixing a saw to said shaft to rotate therewith, means for periodically moving said grinding wheel into and out of engagement with the teeth of said saw, a tapered portion on said shaft, a correspondingly tapered bearing sleeve rotatably supporting said tapered portion, spring means acting to move said shaft longitudinally relative to said tapered bearing sleeve whereby the shaft is held against longitudinal and lateral play and means for periodically rotating said shaft with a step by step movement.

13. A saw grinding machine comprising, a rotatable saw carrying shaft, a circular saw fixed to said shaft, reciprocable means for carrying a saw grinding wheel into or out of engagement with the teeth of said saw, a reciprocable plate and means for reciprocating the same, a nut rotatably mounted on said plate, means for resisting rotation of said nut, a manually rotatable screw threaded into said nut and connected with said grinding wheel carrying means, means for resisting rotation of said screw, means for periodically rotating said saw carrying shaft, a cam on said saw carrying shaft and means actuated by said cam for rotating said nut.

14. The elements in combination defined in claim 13, combined with means for varying the extent of rotation of said nut by said cam actuated means.

15. A saw grinding machine comprising, a circular saw, means for rotatably mounting said saw, reciprocable means for carrying a saw grinding wheel into or out of engagement with the teeth of said saw, a reciprocable plate and means for reciprocating the same, a nut rotatably mounted on said plate, means for resisting rotation of said nut, a manually rotatable screw threaded into said nut and connected with said grinding wheel carrying means, means for resisting rotation of said screw, means for periodically rotating said saw, and means synchronized with said saw rotating means for rotating said nut.

16. The elements in combination defined in claim 15, combined with means for varying the extent of rotation of said nut by said nut rotating means.

17. In a saw grinding machine, a housing support, a drive shaft mounted on and above said housing support at the rear thereof, a beam pivotally mounted on the drive shaft extending over the housing support, a grinding wheel shaft rotatably mounted at the front end of said beam, a grinding wheel on said grinding wheel shaft, means for driving the grinding wheel shaft from said drive shaft, a saw carrying shaft rotatably mounted at the upper part of said housing support adapted to detachably carry a circular saw at one end thereof immediately below the grinding wheel, means driven by said main drive shaft for periodically turning the saw carrying shaft with a step by step movement, means for elevating the beam and grinding wheel carried thereby between the periodical movements of the saw carrying shaft, and means for automatically lowering said beam and grinding wheel carried thereby at the termination of a grinding of all of the teeth in a saw and before the beginning of a second grinding of said teeth.

In testimony whereof I affix my signature.

JAY E. PORTER.